US008553496B2

(12) United States Patent
Decker et al.

(10) Patent No.: US 8,553,496 B2
(45) Date of Patent: Oct. 8, 2013

(54) SEISMIC SOURCE SEPARATION

(75) Inventors: Marvin Glen Michael Decker, Houston, TX (US); Gary Arthur Sitton, Houston, TX (US); Robert Ian Bloor, Houston, TX (US)

(73) Assignee: Ion Geophysical Corporation, Houston, TX (US)

( * ) Notice: Subject to any disclaimer, the term of this patent is extended or adjusted under 35 U.S.C. 154(b) by 673 days.

(21) Appl. No.: 12/703,088

(22) Filed: Feb. 9, 2010

(65) Prior Publication Data
US 2011/0194378 A1    Aug. 11, 2011

(51) Int. Cl.
G01V 1/00        (2006.01)
G01V 1/37        (2006.01)
G01V 1/36        (2006.01)

(52) U.S. Cl.
CPC ... *G01V 1/00* (2013.01); *G01V 1/36* (2013.01); *G01V 1/375* (2013.01)
USPC .............................................. 367/40; 367/38

(58) Field of Classification Search
USPC ........... 367/37, 38, 40, 50, 73, 173; 702/6, 14
See application file for complete search history.

(56) References Cited

U.S. PATENT DOCUMENTS

| 4,715,020 | A | 12/1987 | Landrum, Jr. | |
|---|---|---|---|---|
| 4,982,374 | A | 1/1991 | Edington et al. | |
| 5,410,517 | A | 4/1995 | Andersen | |
| 5,550,786 | A | 8/1996 | Allen | |
| 5,703,833 | A | 12/1997 | Allen | |
| 5,715,213 | A | 2/1998 | Allen | |
| 5,721,710 | A | 2/1998 | Sallas et al. | |
| 6,687,619 | B2 | 2/2004 | Moerig et al. | |
| 6,865,488 | B2 | 3/2005 | Moerig et al. | |
| 7,295,490 | B1 * | 11/2007 | Chiu et al. | 367/48 |
| 8,000,168 | B2 * | 8/2011 | Eick et al. | 367/56 |
| 8,094,514 | B2 * | 1/2012 | Tenghamn | 367/23 |
| 2009/0052278 | A1 * | 2/2009 | Iranpour et al. | 367/38 |
| 2010/0039894 | A1 * | 2/2010 | Abma | 367/52 |

OTHER PUBLICATIONS

MacWilliams et al., "Pseudo-random Sequences and Arrays," *Proceedings of the IEEE*, Dec. 1976, vol. 64, No. 12, pp. 1715-1729.
Tibenderana et al., "Efficient and Robust Detection of GFSK Signals Under Dispersive Channel, Modulation Index, and Carrier Frequency Offset Conditions," *EURASIP Journal on Applied Signal Processing*, 2005, vol. 16, pp. 2179-2729.
Wams et al., "Recent developments in 3-D acquisition techniques using vibroseis in Oman," *The Leading Edge*, Aug. 1998, pp. 1053-1063.

* cited by examiner

*Primary Examiner* — Krystine Breier
(74) *Attorney, Agent, or Firm* — Dorsey & Whitney LLP

(57) ABSTRACT

Seismic acquisition systems are disclosed that allow contemporaneous seismic sources to be separated from a composite signal comprising two or more constituent seismic sources. In some embodiments, a representation of the composite signal may be developed that includes a noise contribution of undesired signals present in the composite signal. Additionally, an operator, referred to herein as an "annihilator", may be developed such that it may be conditioned and inverted to minimize undesired noise contributions in the composite signal. This inversion may assist in recovering the constituent seismic sources from the composite signal. Furthermore, in some embodiments, the accuracy with which the constituent source measurements are approximated may be increased by implementing them as random sweeps having a conventional length.

19 Claims, 5 Drawing Sheets

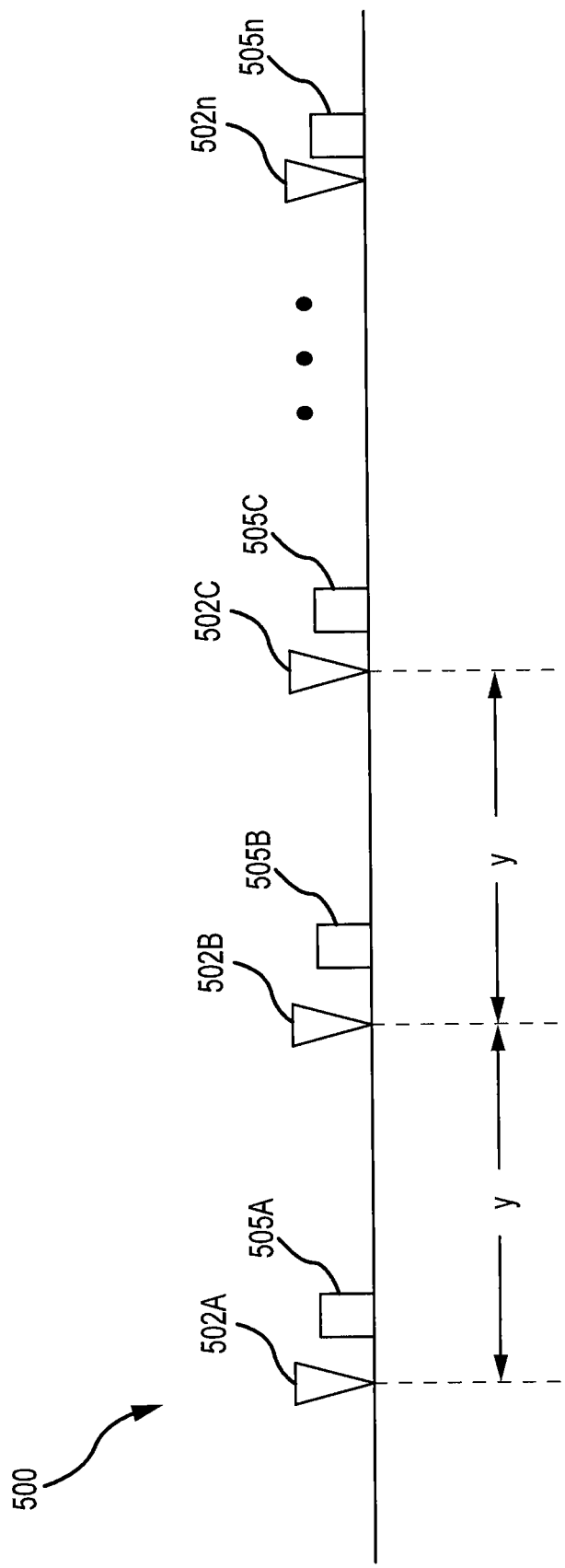

SEISMIC SOURCE SEPARATION

BACKGROUND OF THE INVENTION

Cross-Reference to Related Applications

Not applicable.

BACKGROUND

I. Technical Field

The present invention relates generally to geophysical exploration systems and more particularly to data acquisition in geophysical exploration systems.

II. Background Discussion

Petrochemical products, such as oil and gas, are ubiquitous in society and can be found in everything from gasoline to children's toys. Because of this, the demand for oil and gas remains high. In order to meet this high demand, it is important to locate oil and gas reserves in the Earth. Scientists and engineers utilize, among other things, seismic exploration survey techniques to find oil and gas deposits within the Earth. These seismic exploration techniques often include controlling the emission of seismic energy into the Earth with a seismic source of energy (e.g., dynamite, air guns, and/or vibrators), and monitoring the Earth's response to the seismic source with a receiver (e.g., a geophone, a hydrophone, etc.) By observing the reflected seismic signals detected by the receiver during the survey, geophysical data pertaining to reflected signals may be acquired and these signals may indicate the composition of the Earth proximate to the survey location.

One concern with geophysical surveys is cost. The cost of conducting a geophysical survey varies in proportion to the amount of time that it takes to acquire the geophysical data from the seismic survey—i.e., the greater the data acquisition time, the greater the cost of the survey. Furthermore, longer survey times may have adverse environmental impacts as compared to shorter surveys times, and therefore, decreasing the data acquisition portion of the survey time is often desirable from an environmental perspective too. For at least these reasons, multiple seismic sources are often operated in tandem such that signals are emitted from multiple seismic sources contemporaneously. This allows, for example, sources with different frequency characteristics to be fired contemporaneously rather than having to wait for a source to be fired serially. In this contemporaneous source firing arrangement, the receivers record a superimposed measurement of the reflected energy from the multiple sources as a "blended" signal measurement. (As used herein, the term blended signal refers to a composite signal resulting from two or more seismic sources operating contemporaneously.) Thereafter, a variety of algorithms are used to separate this blended signal into individual signals corresponding to each individual seismic source such that the set of source measurements corresponding to each sweep appear as if they were obtained serially.

One conventional approach to separating seismic sources in a blended signal includes pre-conditioning the multiple sources in time such that they are fired in a time-staggered sequence where there is some overlap in the source measurements of each sweep. This is sometimes referred to as a "slip-sweep" approach. This approach relies on adequate spatial and temporal separation between the sources as well as stacking algorithms to cancel out most of the residual signals from non-desired sources. Depending on the desired objective, varying levels of source separation may provide adequate separation, however, in situations where more detailed needs and reservoir characterization goals, a separation value of around 100:1 or 40 dB may be desired. Unfortunately, these slip-sweep source separation strategies are often sensitive to signal distortion, and as a result, achieving the desired level of separation (e.g., 40 dB) may be difficult.

Other conventional approaches attempt to design the contemporaneous sources such that subsequent processing of multiple source measurements achieves adequate separation between source signals (e.g., 40 dB) and suppression of residual signals from non-desired sources. One seemingly promising area of source signal design and selection is to design the source signals such that each of the source signals have interference patterns with each other that are as random as possible. For example, one class of pseudo-random number sequences, called maximal length sequences, may be designed to be minimally correlated to each other and may be designed to have a substantially flat spectra. In theory, operating these maximal length sequences at conventional sweep lengths (e.g., 16 seconds), will yield sources with approximately 40 dB of separation. However, these theoretical separation numbers may be misleading because they represent a best case. In fact, when accounting for expected dynamic range of two interfering sources, a 40 dB of theoretical separation may drop to approximately 20 dB in practice. This drop may be due, at least in part, by the transfer function of the sources and distortion of the signals as they are put into the ground. Accordingly, methods and apparatuses are needed to provide adequate separation of seismic sources that are fired contemporaneously.

SUMMARY

Embodiments of seismic acquisition systems are disclosed. Some embodiments may include a system for processing geophysical data, the system including a plurality of receivers configured to receive a composite signal resulting from a plurality of contemporaneous seismic sources, a processor capable of generating a representation of the composite signal that may include a noise contribution of at least one undesired seismic source from the plurality of seismic sources, where the processor is also capable of generating an annihilator that may minimize the noise contribution of the at least one undesired seismic source, and a display coupled to the processor, where the display may be capable of displaying at least one desired seismic source from the plurality of seismic sources.

Other embodiments may include a method of processing geophysical data, the method including emitting a first sweep sequence, emitting a second sweep sequence contemporaneous to the first sweep sequence, receiving a blended signal including components of the first and second sweep sequences, determining a blending operator indicative of a noise contribution of the second sweep sequence in the blended signal, and determining a first annihilator capable of increasing a rank of the blending operator.

Still other embodiments may include a tangible storage medium for storing a plurality of instructions, the instructions including cross-correlating a blended signal with a sweep sequence of interest, modeling interference from a sweep sequence not of interest as a linear operator that is rank deficient, approximating an inversion of the linear operator, and increasing the rank of the linear operator.

BRIEF DESCRIPTION OF THE DRAWINGS

FIG. 5 illustrates a two-dimensional acquisition system where the receivers and the sources are arranged on the same line in space.

The use of the same reference numerals in different drawings indicates similar or identical items.

DETAILED DESCRIPTION OF THE INVENTION

Seismic acquisition systems are disclosed that allow contemporaneous seismic sources to be separated from a composite signal comprising two or more constituent seismic sources. In some embodiments, a representation of the composite signal may be developed that includes a noise contribution of undesired signals present in the composite signal. Additionally, an operator, referred to herein as an "annihilator", may be developed such that it may condition the representation of the composite signal and inverted to minimize undesired noise contributions in the composite signal. This inversion may assist in recovering the constituent seismic sources from the composite signal. Furthermore, in some embodiments, the accuracy with which the constituent source measurements are approximated may be increased by implementing them as random sweeps having a conventional length—e.g., four to sixteen sweeps.

In addition, one skilled in the art will understand that the following description has broad application. For example, while embodiments disclosed herein may focus on seismic acquisition systems, it should be appreciated that the concepts disclosed herein equally apply to other systems using non-seismic sources such as magnetic, electrical, and/or electromagnetic sources, to name but a few. Furthermore, while embodiments disclosed herein may focus on land based acquisition systems, the concepts disclosed herein may equally apply to non-land based acquisition systems, such as marine based acquisition systems utilizing contemporaneous marine sources. Also, for the sake of discussion, the embodiments disclosed herein may tend to focus on oil and gas exploration; however, these concepts apply to geophysical exploration in general, including applications outside the oil and gas exploration context. Accordingly, the discussion of any embodiment is meant only to be exemplary and is not intended to suggest that the scope of the disclosure, including the claims, is limited to these embodiments.

Figure 1A:
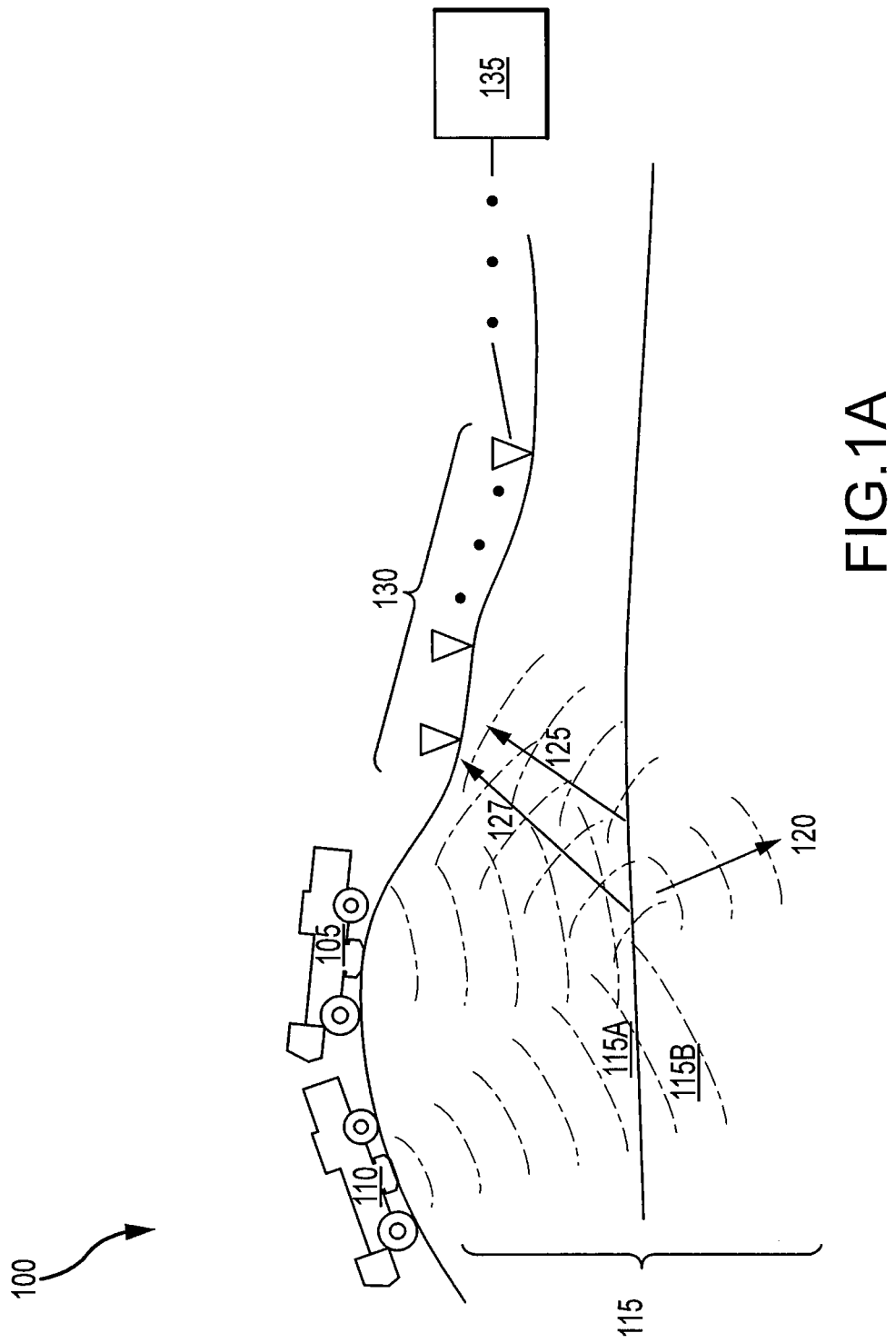
FIG. 1A illustrates a seismic acquisition system used in oil and gas exploration.

FIG. 1A illustrates a seismic acquisition system 100 used in oil and gas exploration. The seismic acquisition system 100 may include a plurality of seismic sources 105 and 110 configured to impart shock waves of seismic energy into a formation 115. These seismic sources 105 and 110 may include vibrators with a large mass placed in contact with the formation 115, where the large mass is struck against the formation 115 to impart seismic energy. In some embodiments, the seismic sources 105 and 110 may include an XVib® tracked chassis vibrator and/or an AHV-IV™ tire-based vibrator both of which are available from Ion Geophysical, Inc. of Houston, Tex.

During operation, the sources 105 and 110 may impart seismic energy into the formation 115 as shown generally in FIG. 1A. The formation 115 may include regions with varying geophysical properties, such as strata 115A and 115B. The seismic energy imparted into the formation 115 may travel through the various strata 115A and 115B, and because of their varying geophysical properties, the strata 115A and 115B may react differently to the imparted seismic energy. For example, at the boundary between the strata 115A and 115B, a certain amount of seismic energy from the source 105 may be absorbed by the strata 115B and continue to travel through the strata 115B. This is indicated in FIG. 1A with an arrow 120 indicating a general direction that the transmitted seismic energy may travel. In addition to the transmitted energy 120 continuing to travel through the strata 115B, a certain amount of seismic energy may be reflected back from the junction of the strata 115A and 115B. This is indicated in FIG. 1A with an arrow 125 indicating a general direction that the reflected seismic energy may travel.

The reflected seismic energy 125 may be measured by an array of seismic receivers 130. The receivers 130 may transmit these seismic measurements, either wirelessly or via a wire line (not specifically shown in FIG. 1A) back to a computer system 135. In some embodiments, the receivers 130 may include a Firefly® system of wireless geophones available from Ion Geophysical, Inc. of Houston, Tex. In other embodiments, the receivers 130 may include a Scorpion® system of wire line geophones available from Ion Geophysical, Inc. of Houston, Tex. and/or an Aries II® system of wire line sensors available from ARAM Systems Ltd., of Calgary, Canada.

The computer system 135 may include one or more computer systems executing seismic processing software. In some embodiments, the computer system 135 may include what is termed a "dog house", which is a computer system that is remotely located in the field along with the receivers 130. Other embodiments may include the computer system 135 that is in a different location than the receivers 130 such that the computer system 135 receives seismic data remotely.

Figure 1B:
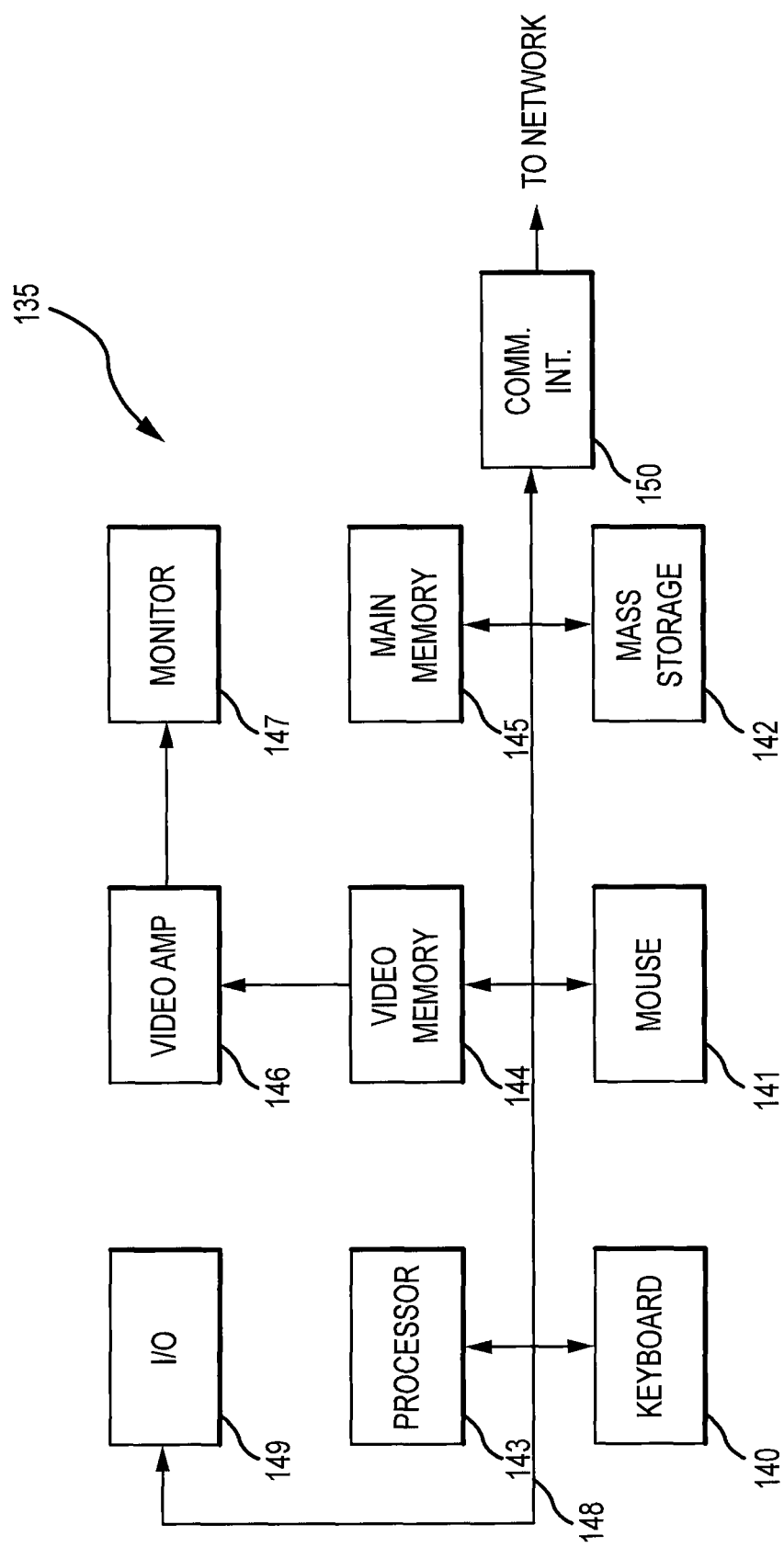
FIG. 1B illustrates an example of the computer system shown in FIG. 1A.

FIG. 1B illustrates an embodiment of the computer system 135 capable of storing and/or processing blended signals in such a way as to allow contemporaneous seismic sources to be separated from a blended signal. In some embodiments, the computer system 135 may be an implementation of enterprise level computers, such as one or more blade-type servers within an enterprise. In other embodiments, the computer system 135 may be a personal computer and/or a handheld electronic device. A keyboard 140 and mouse 141 may be coupled to the computer system 135 via a system bus 148. The keyboard 140 and the mouse 141, in one example, may introduce user input to the computer system 135 and communicate that user input to a processor 143. Other suitable input devices may be used in addition to, or in place of, the mouse 141 and the keyboard 140. An input/output unit 149 (I/O) coupled to the system bus 148 represents such I/O elements as a printer, audio/video (A/V) I/O, etc.

Computer 135 also may include a video memory 144, a main memory 145 and a mass storage 142, all coupled to the system bus 148 along with the keyboard 140, the mouse 141 and the processor 143. The mass storage 142 may include both fixed and removable media, such as magnetic, optical or magnetic optical storage systems and any other available mass storage technology. The bus 148 may contain, for example, address lines for addressing the video memory 144 or the main memory 145. In some embodiments, the main memory 145 is a fully buffered dual inline memory module (FB-DIMM) that communicates serially with other system components.

The system bus 148 also may include a data bus for transferring data between and among the components, such as the processor 143, the main memory 145, the video memory 144 and the mass storage 142. The video memory 144 may be a dual-ported video random access memory. One port of the video memory 144, in one example, is coupled to a video amplifier 146, which is used to drive a monitor 147. The monitor 147 may be any type of monitor suitable for displaying graphic images, such as a cathode ray tube monitor (CRT), flat panel, or liquid crystal display (LCD) monitor or any other suitable data presentation device.

In some embodiments, the processor 143 is a multi-core SPARC® microprocessor from Sun Microsystems, Inc, although any other suitable microprocessor or microcomputer may be utilized. The computer system 135 also may include a communication interface 150 coupled to the bus 148. The communication interface 150 provides a two-way data communication coupling via a network link. For example, the communication interface 150 may be a satellite link, a local area network (LAN) card, a cable modem, and/or wireless interface. In any such implementation, the communication interface 150 sends and receives electrical, electromagnetic or optical signals that carry digital data streams representing various types of information, such as seismic signals that have been separated from a blended signal and/or blended signals.

Code received by the computer system 135 may be executed by the processor 143 as the code is received, and/or stored in the mass storage 142, or other non-volatile storage for later execution. In this manner, the computer system 135 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

Regardless of the actual implementation of the computer system 135, the data processing system may execute operations that allow separation of multiple seismic sources that are fired contemporaneously.

Figure 2:
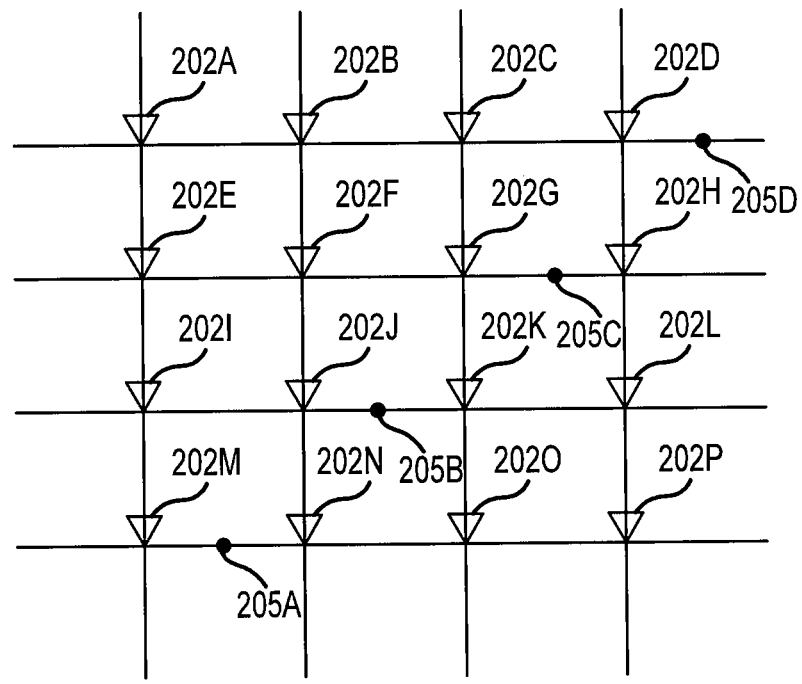
FIG. 2 illustrates a top down view of an array of receivers and a plurality of sources.

FIG. 2 illustrates a top down view of an array of receivers 202A-P and a plurality of sources 205A-D. The receivers 202A-P and sources 205A-D are illustrated in a grid arrangement (i.e., orthogonal to each other), for the sake of discussion. However, depending upon the embodiment, the receivers 202A-P may be arranged in a variety of non-orthogonal configurations. Also, while a certain number of receivers 202A-P and/or sources 205A-D are shown in FIG. 2, the number employed may vary according to the particular embodiment. For example, in some embodiments, the use of 8 sources is believed to provide a desired balance between signal-to-noise ratio considerations versus burdening the computation resources of the computer system 135 (shown in FIGS. 1A and 1B).

Referring to FIGS. 1A and 2, each of the sources 205A-D may be fired contemporaneously with each other. As will be described in greater detail below with regard to the output signals of the seismic sources, the sources 205A-D may be emitting a seismic signal for a certain period of time, referred to herein as a signal "sweep". For example, in some embodiments, the period of time that the sources 205A-D may be emitting a seismic signal may be approximately 16 seconds, and thus the signal sweep may be approximately 16 seconds long. For purposes of this disclosure, the term "contemporaneous" refers to the notion that two or more of the sources 205A-D are being swept at the same time. Therefore, two or more sources still may be considered to be contemporaneous with each other when a first source 205A is just beginning its sweep while a second source is just finishing up its sweep. In some embodiments, the receivers 202A-P may time stamp the received signals received from the sources 205A-D, and thus, two sources would be considered "contemporaneous" to the extent that they have time stamps that overlap.

As the sources 205A-D are fired contemporaneously, the receivers 202A-P may detect a compound or blended signal from the formation 115. This blended signal is shown in FIG. 1A with arrow 127 representing a superimposed version of reflections of signals from sources 105 and 110. Although any number of receivers 205A-P may detect this blended signal at any one point in time, the ratio of the blended signal to noise is greater as more receivers 205A-D are used.

Figure 3:
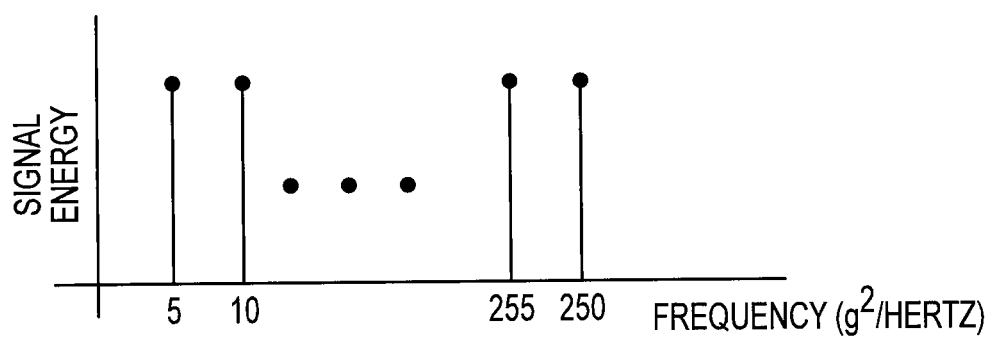
FIG. 3 depicts a graph of a signal sweep that may be output by the seismic sources.

FIG. 3 depicts a graph of a signal sweep that may be output by the seismic sources 205A-D. The ordinate axis of FIG. 3 represents the energy levels of various frequency components of the signal sweep (shown in FIG. 3 in units gravity squared per hertz) whereas the abscissa axis represents the various frequencies that are swept. Note that spectrum of the seismic source signal may be substantially flat as shown by the energy level being substantially the same at each frequency. For the sake of discussion, the signal sweep is shown in FIG. 3 with frequencies ranging from 5 Hz to 250 Hz, although the range of frequencies may vary between different embodiments. The distribution of frequencies may be random such that the presence of energy at any given frequency may vary randomly.

Referring to FIGS. 2 and 3, the sources 205A-D may emit randomized signal sweeps. In some embodiments, the sweeps emitted by the various sources may be designed to be randomly correlated with one another. For example, in some embodiments, the sweeps emitted by the sources 205A-D may be designed using maximum length sequences that exhibit spectral flatness and are minimally correlated with other maximum length sequences. Thus, the sweeps emitted by the sources 205A-D may resemble the sweep illustrated in FIG. 3, where the distribution of signals at the various frequencies may be randomized with respect to each other.

Examples of operations for selecting signals to be emitted by the sources 205A-D are illustrated generally in commonly owned U.S. patent application Ser. No. 11/856,386, which was filed Sep. 17, 2007 and titled "Generating Seismic Vibrator Signals". This patent application is incorporated herein in its entirety as if reproduced in full below. In the event that the operations disclosed in U.S. patent application Ser. No. 11/856,386 are employed in selecting the seismic source signals for the sources 205A-D, then in some embodiments, these operations may be further optimized.

Figure 4:
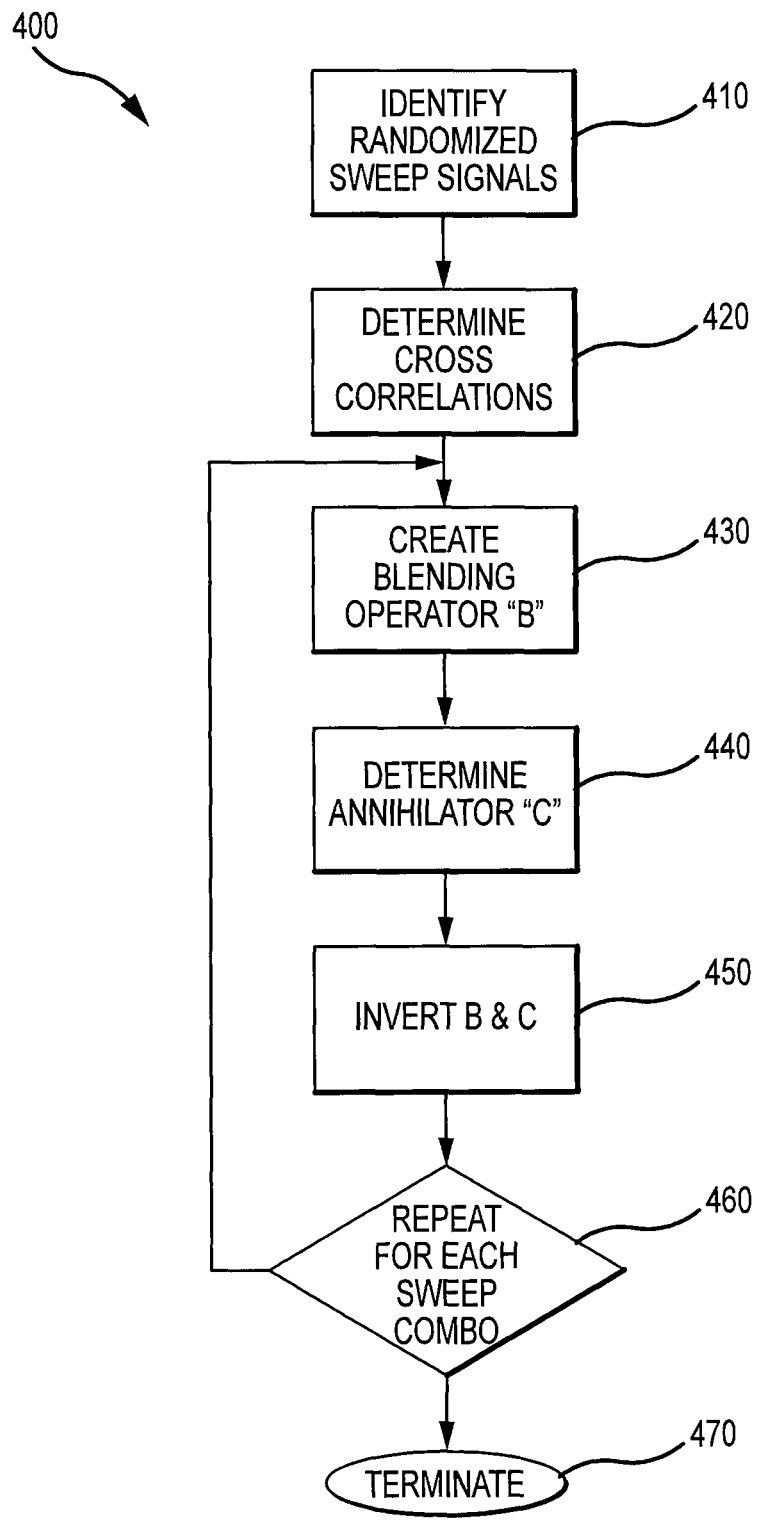
FIG. 4 illustrates operations that may be performed during data processing operations in order to separate multiple seismic source signals from a blended signal.

FIG. 4 illustrates operations 400 that may be performed by the computer system 135 during data processing operations in order to separate multiple seismic source signals from a blended signal. As shown in operation 410, multiple sweep sequences may be identified that are distinct and random with respect to each other. For example, referring momentarily back to FIG. 2, the sweep sequence emitted from the source 205A may be distinct and random as compared to the sweep sequence that is contemporaneously emitted from the source 205B. The overall number of distinct and random sweep sequences identified in the operation 410 may vary between embodiments. For purposes of discussing the Equations set forth below, the variable n will be used to refer to the number of distinct and random sweep sequences identified by the operation 410. Also, for purposes of discussing the Equations set forth below, the variable i will be used to refer to each of the different source locations. For example, referring momentarily back to the FIG. 2, there are four source locations illustrated therein 205A-D, and thus, the variable i would equal four in this embodiment.

In some embodiments, the distinct and randomized sweep sequences may be rotated among the different source positions during different contemporaneous sweeps. For example, the random and distinct sweep sequences may be identified in operation 410 as sweep sequences 1, 2, 3, and 4, where the sources 205A-D each respectively emit one of these sequences during each contemporaneous sweep—i.e., the source 205A emits sequence 1, the source 205B emits sequence 2, the source 205C emits sequence 3, and the source 205D emits sequence 4. The contemporaneous emission of the sequences 1-4 by the sources 205A-D may occur during an emission period, e.g., 16 seconds in some embodiments. In this example, during a subsequent emission period, the random and distinct sequences may be rotated such that the source 205A emits sequence 2, the source 205B emits sequence 3, the source 205C emits sequence 4, and the source 205D emits sequence 1. In some embodiments, this rotation process may continue in subsequent emission periods such that the sources at each of the various locations have an opportunity to emit each of the n distinct and random sequences identified by the operation 410.

As mentioned above, by emitting the n distinct and random sequences contemporaneously from i different source locations, a blended signal may be measured by the array of receivers. Equation (1) illustrates an expression of the blended signal S as measured by the array of receivers during a contemporaneous emission of multiple sweep sequences. By using the measured value of the blended signal S, individual measurements from each of the $s_n$ sources may be determined.

$$S = +E_1 \otimes s_1 + E_2 \otimes s_2 + \ldots E_n \otimes s_n \qquad \text{Eq. (1)}$$

Assuming for purposes of discussion that each distinct and random sequence corresponds to a single source location i, then the n will be equal to i, and Equation (1) can alternatively be expressed as Equation (2).

$$S = \sum_{i=1}^{n} E_i \otimes s_n \qquad \text{Eq. (2)}$$

Referring to Equation (2), the variable $E_i$ refers to a matrix having columns that generally correspond to measurements from an array of receivers, where those measurements represent an impulse response from a source located at position i. For example, referring back to the array of receivers 202A-P and sources 205A-D shown in FIG. 2, the location i referred to in Equation (2) may correspond with the location of the source 205A for $E_1$ where the source 205A emits a first distinct and random sequence out of the n possible sequences and the number of columns in the matrix $E_1$ may be equal to the number of receivers 202A-P. (The number of rows may correspond to the number of time samples during the listen time of the receivers). Likewise, the location i referred to in Equation (2) may correspond with the location of the source 205B for $E_2$ where the source 205B emits a second distinct and random sequence out of the n possible sequences and the number of rows and columns in the matrix $E_2$ also may be equal to the number of receivers 202A-P.

As mentioned previously, the measured value for the blended signal S may be used to approximate the individual sweep sequences measured by the receivers. Referring still to FIG. 4, operation 420 may include determining the cross correlation of each of the source sweep sequences to approximate the individual sweep sequence contributions to the blended signal S. Since cross correlating a signal is equal to convoluting the time reversal of that signal, Equation (3) illustrates one embodiment of cross correlating the individual sweep sequences per the operation 420.

$$\tilde{S} = S \otimes \bar{s}_i \qquad \text{Eq. (3)}$$

Referring to Equation (3), the blended signal S is convoluted with the time reversal of the sweep sequence $\bar{s}_i$ (originating at the source location i). This convolution yields an approximation of the individual contribution of the sweep sequences $\tilde{S}_i$ at the source location i. Note that the approximation of the individual contribution of the sweep sequences $\tilde{S}_i$ shown in Equation (3) includes interference from other non-desired sweep sequences. For example, referring back to Equation (1) and assuming that the sweep sequence emitted from the $s_1$ source at location one is the source of interest, the blended signal S includes contributions of sweep sequences from non-desired sources given by $E_2 \otimes s_2 + \ldots E_n \otimes s_n$, and thus, cross correlating this blended signal S with the time reversal of the source $\bar{s}_1$, as shown in Equation (3), yields the individual contributions of these non-desired sources to $\tilde{S}_1$ in the form of interference or noise as well as the contribution from the desired source $\bar{s}_1$. Equation (4) illustrates the interference contribution Int from sources other than $s_i$ (hence the $j \neq i$ term excluding the source of interest at the location i).

$$\text{Int} = \sum_{i=1, j \neq i}^{n} E_j \otimes s_j \otimes \bar{s}_i \qquad \text{Eq. (4)}$$

Since the sweep sequences from the non-desired sources are minimally correlated with the source of interest, their cross correlations may be treated as identically and independently distributed random variables in time. According to the central limit theorem, the sum of the cross terms may have an expected value of zero with a variance that is, in general, inversely proportional to the number of sweep locations. Thus, as more sweep sequences are used contemporaneously, the signal-to-noise ratio of the separation between sweep sequences may improve according to $$\frac{1}{\sqrt{n}},$$

where n is the number of contemporaneous sweep sequences emitted by the sources.

The interference identified in Equation (4) may be modeled as a linear operator, termed herein as a "blending" operator B, which is shown in Equation (5). This is illustrated in FIG. 4 as operation 430. Modeling the interference as the blending operator B allows the quality of separation between individual source contributions in the blended signal S to be improved by employing linear optimization techniques that approximate an inversion of the blending operator B.

$$\begin{bmatrix} s_1 \otimes \bar{s}_1 & s_2 \otimes \bar{s}_1 & \cdots & s_n \otimes \bar{s}_1 \\ s_1 \otimes \bar{s}_2 & s_2 \otimes \bar{s}_2 & \cdots & s_n \otimes \bar{s}_2 \\ \vdots & \vdots & \cdots & \vdots \\ s_1 \otimes \bar{s}_n & s_2 \otimes \bar{s}_n & \cdots & s_n \otimes \bar{s}_n \end{bmatrix} \begin{bmatrix} E_1 \\ E_2 \\ \vdots \\ E_n \end{bmatrix} = B \cdot \begin{bmatrix} E_1 \\ E_2 \\ \vdots \\ E_n \end{bmatrix} = \begin{bmatrix} \tilde{S}_1 \\ \tilde{S}_2 \\ \vdots \\ \tilde{S}_n \end{bmatrix} \qquad \text{Eq. (5)}$$

Referring to Equation (5), the blending operator B has an argument in the form of a vector of matrices $E_1, E_2, \ldots E_n$. By multiplying the blending operator B by the matrix vector $E_1$, $E_2, \ldots E_n$ as shown in Equation (5), the blending operator B may be applied to each column of the matrix vector $E_1$, $E_2, \ldots E_n$. Notably, the blending operator B is rank deficient with rank equal to the first row.

In some embodiments, an annihilator C may be determined such that the rank of the blending operator B may be increased. This is generally shown in operation 440.

FIG. 5 illustrates a two-dimensional acquisition system 500 where the receivers and sources are arranged on the same line in space. The two-dimensional acquisition system 500 is used here for the sake of discussing the annihilator C, however it should be appreciated that numerous other arrangements are possible in different embodiments. Referring to FIG. 5, n receivers 502A-n are shown receiving seismic signals from n sources 505A-n, where the receivers 505A-n and the sources 502A-n are at adjacent locations and separated by a distance of y. Depending upon the embodiment, the separation distance y may vary. For example, in some embodiments, the value of y may be in the range of 10-50 meters. Also, while the acquisition system 500 is illustrated in FIG. 5 with the receivers 502A-n and the sources 505A-n substantially close to each other, the sources 505A-n may be located anywhere between the adjacent receivers 502A-n.

In general, two adjacent sources, such as 505A and 505B, produce signals at the respective receivers that are substantially similar with respect to offset distance. For example, referring to the acquisition system 500 shown in FIG. 5, the signal measured at the receiver 502B due to the source 505A may be substantially the same as the signal measured at the receiver 502C due to the source 505B. In the contemporaneous emission and acquisition scenario, the residual energy from adjacent sources is distinct for each sweep sequence. This distinctness of the residual energy from adjacent sources, and the fact that adjacent sources generally produce signals that are substantially the same with respect to offset, may be used to construct the annihilator C such that minimizes stationary signals—i.e., signals that are similar between adjacent receiver locations. The annihilator C may be represented as shown in Equation (6).

$$C \cdot \begin{bmatrix} E_1 \\ E_2 \\ \vdots \\ E_n \end{bmatrix} = \begin{bmatrix} 0 \\ 0 \\ \vdots \\ 0 \end{bmatrix} \quad \text{Eq. (6)}$$

The annihilator C may augment the blending operator B such that the rank of the blending operator B may be increased. Non-contemporaneous independent sweep sequences emitted from the sources 505A-n may vary continuously with respect to offset down the line for acquisition system 500 (i.e., from 505A to 505n). Because of this, a sparse annihilator C may be constructed based on the constraints illustrated in Equation (7).

$$E_1(s_1)_y - E_2(s_2)_y = 0 \quad \text{Eq. (7)}$$
$$E_2(s_2)_y - E_3(s_3)_y = 0$$
$$\vdots$$
$$E_{n-1}(s_{n-1})_y - E_n(s_n)_y = 0$$

Referring to Equation (7) in conjunction with FIG. 5, $E_n(s_n)_y$ indicates a receiver a distance y from $s_n$. As can be appreciated by inspection of Equation (7), each distance y between sources 505A-n is a separate system and each system has full rank. Using these techniques to construct the annihilator C, a Tikohnov regularization problem may be identified as illustrated in Equation (8).

$$(B^tB + \lambda C^tC)e = B^t\tilde{s} \quad \text{Eq. (8)}$$

Referring to Equation (8), $$e = \begin{bmatrix} E_1 \\ E_2 \\ \vdots \\ E_n \end{bmatrix}, \tilde{s} = \begin{bmatrix} \tilde{s}_1 \\ \tilde{s}_2 \\ \vdots \\ \tilde{s}_n \end{bmatrix}$$

$\lambda$ is the Tikohnov parameter, and B is the blending operator computed above in conjunction with Equation (5). With Equation (8) determined, the blending operator B and the annihilator C now may be inverted.

In general, the annihilator C may be derived from constraints involving multiple contemporaneous sources with offsets weighted. Such a system often has context sensitive conditioning, and therefore, a technique to invert the resulting system of equations should be carefully selected.

In some embodiments, a singular value decomposition (SVD) may be used to invert the resulting system of equations. Equation (8) may be computationally intensive for purposes of applying SVD. Since convolution may be posed in the frequency domain as a diagonal operator, and since conditioning constraints may be defined on a frequency-by-frequency basis, then the size of the system may be reduced by an order of magnitude and thereby ease the computational requirements for SVD application. For example, using the sparse annihilator C described above with regard to Equation (7), the normal form of Equation (8) may be reduced to systems with $n^3R$ constraints where n is the number of sources and R is the number of receivers. In addition, the normal forms of the resulting system of equations remain sparse, and therefore, iterative approaches (such as Lanczos approaches) may be employed in these embodiments. More specifically, as can be appreciated from inspection, the normal form of the blending operator B is sparse. With regard to the annihilator C, however, the number of non-zero entries in each row may be governed by the maximum number of intersections of receiver positions for the given source relations. Since any given receiver position can occur in at most n constraints, each corresponding to different offset classes, non-zero inner products may be obtained at most n times.

In other embodiments, a rank-revealing QR may be utilized to invert Equation (8), where the term QR stems from the classical QR decomposition of a matrix.

With the blending operator B and the annihilator C inverted, operations 430, 440, and 450 may be recomputed for each sweep combination per operation 460. For example, referring momentarily back to FIG. 2, once measurements associated with sweep sequence number one from the source 205A are processed, then measurements associated with sweep sequence number two from the source 205B may be processed by looping back through operations 430, 440, and 450. In some embodiments, once each of the n contemporaneous sweep sequences have been processed, the operations 400 may terminate at operation 470.

Given the previous discussion, a general construction of the annihilator C will now be presented. A general form of the annihilator C stipulates determining the coefficients $\lambda_{j,y,\omega}^i$ such that Equation (9) is minimized for each triple i, y, ω.

$$E_i(i_y)(\omega) - \sum_{j \neq i} \lambda_{j,y,\omega}^i E_j(j_y)\omega \qquad \text{Eq. (9)}$$

Referring to Equation (9), $E_i(i_y)(\omega)$ denotes the impulse response of the receiver array for the source at location i with offset y and frequency ω. By measuring individual test sweep sequences from each source, each of the $E_i(i_y)(\omega)$ may be known and the dual problem of solving for the coefficients $\lambda_{j,y,\omega}^i$ may be instituted.

Generally, the system may be under-determined and sensitive to noise in the measured wavefields. Thus, the degrees of freedom may be restricted to improve the condition of the dual system. For example, $\lambda_{j,y,\omega}^i$ may be made invariant with respect to one or more of the triple values i, y, ω, which may cause the dual problem to be over-determined.

The annihilator C may be recomputed for different areas of the survey and used locally, or the predictive coefficients may be recomputed for each separation problem using an interpolation strategy or even recomputed for successive separations. In this manner, an initial annihilator that works well near the test site may be used to separate acquisitions in close proximity to the test site, and then these may be used to compute new annihilators that work well for new areas of the survey. This allows for updated annihilators without increasing survey time to generate annihilators in-field.

The operator is a way to condition a ill-conditioned system and to act in the null-space of the interference operator. Accordingly, inaccurate annihilators, properly weighted, may sufficiently condition the interference operator to produce an acceptable result.

Furthermore, as mentioned above, although two or more sources may be contemporaneous with each other to the extent that they have time stamps that overlap, the Annihilator and blending operators discussed herein may account for temporal shifts. For example, because the Annihilator and blending operator are expressed in the frequency domain, accounting for the temporal shifts may occur by imposing linear scales on each.

What is claimed is:

1. A method of processing geophysical data, the method comprising the acts of:
   emitting a first sweep sequence;
   emitting a second sweep sequence contemporaneous to the first sweep sequence, the second sweep sequence being distinct from and randomly correlated with the first sweep sequence;
   receiving a blended signal that includes components corresponding to the first and second sweep sequences;
   determining a blending operator indicative of a noise contribution of the second sweep sequence in the blended signal, wherein the blending operator is a measure of interference between the first and second distinct and randomly correlated sweep sequences; and
   determining a first annihilator capable of increasing a rank of the blending operator;
   wherein at least one of the acts of determining the blending operator and/or determining the first annihilator is performed using a computer system.

2. The method of claim 1, wherein the first and second sweep sequences have frequency spectra that are substantially flat.

3. The method of claim 1, wherein the first and second sweep sequences are implemented using maximum length sequences.

4. The method of claim 1, wherein the act of emitting the first sweep sequence occurs using a first source and the act of emitting the second sweep sequence occurs using a second source.

5. The method of claim 4, further comprising the act of optimizing the first sweep signal to the first source prior to the act of emitting the first sweep sequence.

6. The method of claim 5, wherein the act of optimizing includes employing least-squares operations.

7. The method of claim 4, wherein the act of emitting the first sweep sequence occurs using the second source and the act of emitting the second sweep sequence occurs using the first source on a subsequent sweep.

8. The method of claim 4, wherein the act of receiving occurs using multiple receivers.

9. The method of claim 8, wherein the receivers comprise geophones.

10. The method of claim 1, wherein the act of determining the blending operator includes cross correlating the blended signal with the first sweep sequence.

11. The method of claim 1, further comprising the act of inverting the blending operator and the first annihilator.

12. The method of claim 1, further comprising the act of measuring test sweeps for the first and second sweep sequences.

13. The method of claim 1, further comprising the act of determining a second annihilator based on the first annihilator.

14. The method of claim 13, wherein the second annihilator relates to a separate geographic location than the first annihilator.

15. The method of claim 13, further comprising the act of interpolating the first annihilator to determine the second annihilator.

16. The method of claim 1, wherein the blending operator is further a measure of separation between the first and second distinct and randomly correlated sweep sequences.

17. A method of processing geophysical data, the method comprising the acts of:
   emitting a first sweep sequence;
   emitting a second sweep sequence contemporaneous to the first sweep sequence;
   receiving a blended signal that includes components corresponding to the first and second sweep sequences;
   determining a blending operator indicative of a noise contribution of the second sweep sequence in the blended signal; and
   determining a first annihilator capable of increasing a rank of the blending operator;
   wherein the blending operator indicative of the noise contribution of the second sweep sequence in the blended signal comprises $$\sum_{i=1, j \neq i}^{n} E_j \otimes s_j \otimes \bar{s}_i,$$

where $s_j$ is the second sweep sequence, $E_j$ refers to a matrix having columns that generally correspond to measurements of the second sweep sequence from an array of receivers, and $\bar{s}_i$ is the time reversal of the first sweep sequence $s_i$ that originates at a location l;

further wherein at least one of the acts of determining the blending operator and/or determining the first annihilator is performed using a computer system.

18. A method of processing geophysical data, the method comprising the acts of:
    emitting a first sweep sequence;
    emitting a second sweep sequence contemporaneous to the first sweep sequence;
    receiving a blended signal that includes components corresponding to the first and second sweep sequences;
    determining a blending operator indicative of a noise contribution of the second sweep sequence in the blended signal; and
    determining a first annihilator capable of increasing a rank of the blending operator;
    wherein the act of determining the first annihilator comprises determining the coefficients $\lambda_{j,y,\omega}^{i}$ such that $$E_i(i_y)(\omega) - \sum_{j \neq i} \lambda_{j,y,\omega}^{i} E_j(j_y)\omega$$

is minimized for each triple i, y, $\omega$, where $E_i(i_y)(\omega)$ denotes the impulse response of an array of receivers for a source at location i, with offset y between the source and the array of receivers, and frequency $\omega$;

further wherein at least one of the acts of determining the blending operator and/or determining the first annihilator is performed using a computer system.

19. A method of processing geophysical data, the method comprising the acts of:
    emitting a first sweep sequence;
    emitting a second sweep sequence contemporaneous to the first sweep sequence;
    emitting a third sweep sequence;
    receiving a blended signal that includes components corresponding to the first and second sweep sequences;
    determining a blending operator indicative of a noise contribution of the second sweep sequence in the blended signal;
    determining a first annihilator capable of increasing a rank of the blending operator; and
    inverting the blending operator and the first annihilator;
    wherein the acts of determining the blending operator, determining the first annihilator, and inverting are performed on the third sweep sequence after being performed on the second sequence;
    further wherein at least one of the acts of determining the blending operator, determining the first annihilator, and/or inverting the blending operator and the first annihilator is performed using a computer system.

* * * * *